UNITED STATES PATENT OFFICE.

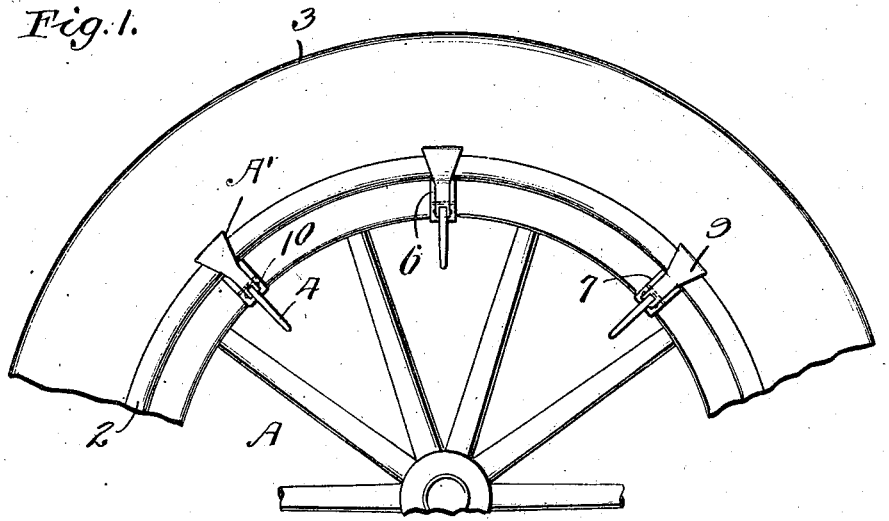
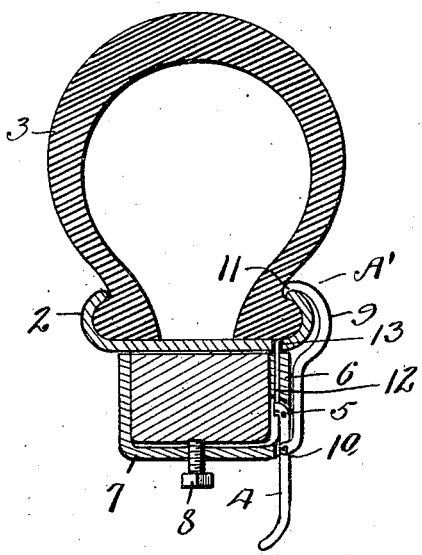
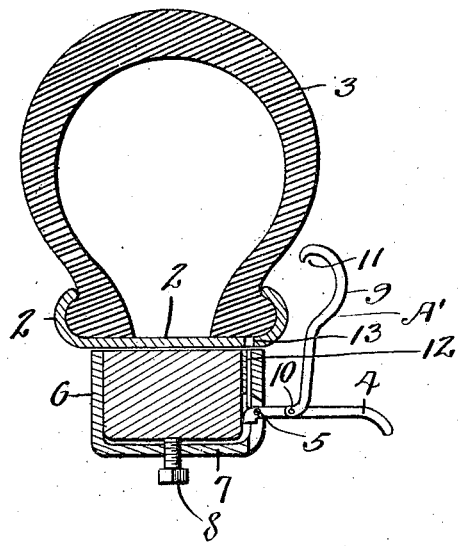

WALTER B. CHRISTOPHER, OF BIRMINGHAM, ALABAMA, ASSIGNOR OF ONE-HALF TO CAD C. BAXTER, OF BIRMINGHAM, ALABAMA.

AUTOMOBILE-CLAMP.

1,145,293. Specification of Letters Patent. Patented July 6, 1915.

Application filed July 11, 1914. Serial No. 850,362.

*To all whom it may concern:*

Be it known that I, WALTER B. CHRISTOPHER, a citizen of the United States, residing at Birmingham, in the county of Jefferson and State of Alabama, have invented new and useful Improvements in Automobile-Clamps, of which the following is a specification.

This invention relates to automobile rims and fastening means therefor, the object in view being to provide simple, practical and reliable means for securely fastening automobile rims upon vehicle wheels, the fastening means being operable entirely by hand and without the necessity of using any tools whatever. Furthermore, by means of the construction hereinafter described, an automobile rim with the tire thereon may be applied to or removed from the wheel in a very short period of time.

With the above and other objects in view, the invention consists in the novel construction, combination and arrangement of parts, as herein described, illustrated and claimed.

In the accompanying drawings:—Figure 1 is a side elevation of a sufficient portion of a vehicle wheel to illustrate the application of the present invention thereto. Fig. 2 is an enlarged cross section through the felly, rim and tire, showing the working position of one of the rim clamps. Fig. 3 is a similar view showing the clamp released.

Referring to the drawings A generally designates a vehicle wheel, 2 the demountable rim and 3 the tire.

In carrying out the present invention I employ a circular series of rim clamps one of which is designated generally at A. Each rim clamp comprises a hand manipulated lever 4 which is fulcrumed at 5 on one of the side portions 6 of a felly embracing clip or iron 7. This clip embraces the inner face of the felly with the arms 6 extending on opposite sides thereof and is secured to the felly by means of a cap screw 8 or its equivalent.

9 designates a clamping hook which is pivotally connected at 10 to the lever 4 at a distance from the fulcrum 5 so that when the lever 4 is moved toward the center of the wheel, the bill 11 of the hook will engage the rim 2 and draw the same tightly against the felly. Simultaneously with this movement of the lever 4, a sliding bolt 12 is moved outwardly or away from the center of a wheel until it enters an opening or socket 13 in the rim 2 as shown in Fig. 2 thus locking the rim in all directions, laterally as well as longitudinally. In the reverse movement of the lever 4 or, in other words when said lever 4 is moved away from the center of the wheel, the bolt 12 is withdrawn from the socket 13 in the rim and simultaneously therewith the hook 9 is moved out of engagement with the rim. The hook 9 may now be swung laterally away from the wheel so as to allow the demountable rim to be taken off the felly. The screws 8 provide for adjusting the clips 7 in relation to the felly to regulate the gripping and holding action of the clamping hooks.

By means of the construction above described, a rim may be quickly demounted from a vehicle wheel and as quickly remounted thereon.

What I claim is:—

1. In a demountable rim for vehicle wheels, the combination of a wheel, a demountable rim encircling and supported by the felly of said wheel, and a series of clamps for holding said rim in fixed relation to said felly, each of said clamps embodying a clamping lever pivotally connected with said felly, and a rim engaging hook pivotally attached to said lever at a distance from the pivot of the lever, adapting said hook to be drawn toward the center of the wheel by said lever when the free end of the lever is moved in a corresponding direction.

2. In a demountable rim for vehicle wheels, the combination with a wheel, of a rim, and a series of rim clamps each of which comprises a clamping lever fulcrumed on the wheel felly, a rim-engaging hook pivotally attached to said lever at a distance from the fulcrum point of the lever, and a rim locking bolt actuated by said lever.

3. In a demountable rim for vehicle wheels, the combination with a wheel felly, of a demountable rim, and a series of rim clamps each of which comprises a U-shaped clip embracing the felly from the inner side thereof, a clamping lever fulcrumed on said clip, and a rim-engaging hook pivotally attached to said lever at a distance from the fulcrum point of the lever.

In testimony whereof I affix my signature in presence of two witnesses.

WALTER B. CHRISTOPHER.

Witnesses:
C. C. BAXTER,
R. D. JOHNSTON, Jr.

Copies of this patent may be obtained for five cents each, by addressing the "Commissioner of Patents, Washington, D. C."